H. H. GOVE.
CARBON SHEARING AND COMPRESSION DEVICE FOR INTERNAL COMBUSTION ENGINES.
APPLICATION FILED DEC. 28, 1917.

1,349,757.

Patented Aug. 17, 1920.

Inventor:
Henry H. Gove
By James R. Hodder
Attorney

UNITED STATES PATENT OFFICE.

HENRY H. GOVE, OF BIDDEFORD, MAINE, ASSIGNOR TO GOVE MOTOR COMPANY, OF BIDDEFORD, MAINE, A CORPORATION OF MAINE.

CARBON-SHEARING AND COMPRESSION DEVICE FOR INTERNAL-COMBUSTION ENGINES.

1,349,757.  Specification of Letters Patent.  Patented Aug. 17, 1920.

Original application filed April 10, 1914, Serial No. 830,906. Divided and this application filed December 28, 1917. Serial No. 209,216.

*To all whom it may concern:*

Be it known that I, HENRY H. GOVE, a citizen of the United States, and resident of Biddeford, in the county of York and State of Maine, have invented an Improvement in Carbon-Shearing and Compression Devices for Internal-Combustion Engines, of which the following description, in connection with the accompanying drawings, is a specification, like letters on the drawings representing like parts.

My present invention is a combined carbon shearing and compression packing intended for use in any part of a machine, where the functions of carbon shearing and tight packing are desirable, particularly in the constructions of internal combustion engines. While my invention is of particular value in connection with rotary valves for internal combustion engines, it is not limited to such valve use, but may be advantageously utilized in any construction where a rotating member is designed and adapted to fit into a casing, and particularly where a packing device is requisite in such rotatable construction.

My present application is a divisional from my copending case Ser. No. 830,906, filed April 10, 1914, upon a rotary valve for internal combustion engines, so far as the subject-matter in common is contained, I having claimed such carbon shearing and compression device in combination with the rotary valve therein shown. In my later copending application, Ser. No. 97,458, filed May 15, 1916, I have shown, described and claimed the particular type of carbon shearing and compression device in a rotary valve construction for internal combustion engines, having the special form of cross-bar and ring connections therein illustrated. In my present application, I have elected to claim, broadly, the carbon shearing and compression device illustrated in said two prior applications, without limiting the same to the valve construction shown and explained by said copending applications, having discovered that this device is suitable for and applicable to a large number of uses, in addition to those illustrated in said prior applications.

In my development of internal combustion engines and rotary valves therefor, as shown by my Patent No. 1,249,066, and said two copending applications, I have found that one of the principal difficulties to be encountered and overcome in any engine relying upon hydrocarbon for fuel, is the carbon forming tendency in such engine to coat and clog the moving parts. It is, therefore, of the utmost importance to provide means, preferably automatic, which shall remove any carbon coating formed in the bearings, or between moving parts, and preferably to provide automatic means which will prevent such a coating from forming. It is the object of the present invention to both prevent and remove any carbon deposit from forming, or when formed, between the bearings in an engine. Numerous points in hydrocarbon engine construction are open for the utilization of my automatic carbon shearing device. In the engine cylinder, in the valves thereto, and particularly in the exhaust passage, or passages from a cylinder, the coating of carbon is most liable to occur.

I believe it to be broadly new in an internal combustion engine, to provide automatic means specially designed to prevent carbon forming and if formed, to remove the same, during the continuous operation of the engine, and therefore I wish to claim this feature broadly. In carrying out my present invention, I provide a plurality—preferably two—inherently expansible members, uniting them firmly and rigidly by a crossbar or member having thereon a carbon shearing edge, corner, or equivalent means, said crossbar being held and positioned against the bearing surface on which carbon may form, by the automatic action of the expansible members. I may have a plurality of such crossbars carrying carbon shearing means, but I find that one such member is usually sufficient.

I find it advisable to have the entire carbon shearing device housed in suitable recesses within a movable part of the engine construction so that the device will be moved across the relatively fixed bearing surface from which the carbon is to be removed, as will be further explained.

Referring the the drawings, illustrating preferred embodiments of the invention, Figure 1 is a perspective view of the carbon shearing and compression device;

Fig. 2 being a fragmentary perspective of a portion of a rotary valve sleeve having recesses adapted to receive the device of Fig. 1;

Figure 1:
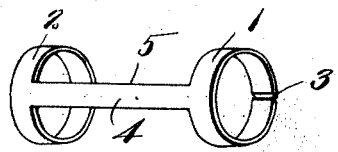
Figure 2:
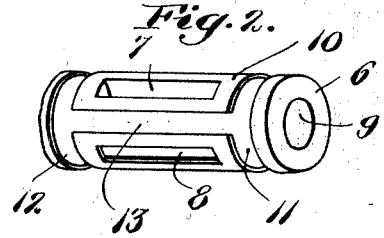
Figure 3:
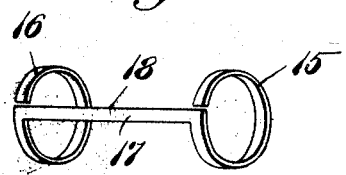
Fig. 3 is a perspective view of a modified form of a device.
Figure 4:
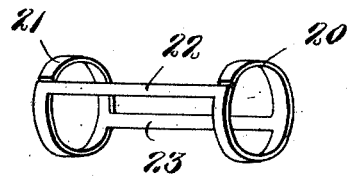
Fig. 4 is a similar view of a still further modified form having a plurality of cross members.

The particular application of my novel form of carbon shearing and compression device, herein illustrated, is adapted to be utilized with a rotary valve sleeve, the illustrations of Figs. 1 and 2 corresponding to Figs. 4 and 3 respectively of said prior application 830,906, of which the present is a divisional, so far as this form is shown; Fig. 3 corresponding to Fig. 4 of said prior application 97,458; but I do not wish to be limited, in the present invention, to the devices applied only to the rotary valve, as in my said prior copending applications, as I believe that this device is applicable to other constructions than the rotary valve arrangements in my said two applications.

As shown in Fig. 1, the combined carbon shearing and compression device comprises a pair of inherently expansible ringlike members 1 and 2, each being split, as shown at 3, to permit the normal expansion or springlike action of said members. These two expansible members are joined by a cross bar 4, having a carbon shearing edge, ridge or corner 5, which corner is held upwardly and outwardly through the springlike action of the parts 1 and 2, and the position of the cross member 4, said device being adapted for rotative movement in a direction whereby the edge or corner 5 will act against a fixed surface—such as the casing for the valve—to remove when formed, and to prevent the forming, of any carbon or other deposit thereon. I prefer to arrange for a relative movement of this device in connection with a rotary member, such as the fragmentary valve or sleeve, shown in Fig. 2, which comprises the member 6 having ports 7 and 8 into interior passages, one being illustrated at 9 to receive the fuel supply, an exhaust port extending entirely through, or through a further concentric sleeve within the member 6, as fully shown and explained in my said prior applications. Formed in the outer surfaces 10 of this valve 6 are suitable recesses 11 and 12 for the ringlike members 1 and 2 respectively, and a cross recess 13 to receive the cross bar 4 of said device. These recesses are formed of substantially equal or slightly greater depth than the thickness of metal in the members 1, 2 and 4, permitting them to have a certain amount of "play" or yield, and to permit the expansible members 1 and 2 acting to normally force or hold the cross-bar 4 outwardly, as well as permitting the members 1 and 2 to expand outwardly against the walls of the casing within which the valve 6 may rotate. This construction permits the edge 5 to be forced upwardly and outwardly, and to rotate with the valve 6, thus positively scraping the fixed bearing walls in the casing for said valve 6, and removing the carbon deposit or any other foreign matter therefrom, preventing the valve from sticking, insuring ease of rotation, and furthermore acting as a compression tight device around the valve walls and particularly adjacent the ports 7 and 8. In Fig. 3 a slightly different type of carbon shearing and compression device is illustrated, wherein the ring-like members 15 and 16 are united by a cross bar 17 at one end of the split portions of said rings, the edge 18 being held outwardly and upwardly in a somewhat more efficient carbon shearing manner than the form shown in Fig. 1. The crossbar 17 may have said edge 18 thereupon, or a ridge formed thereon as a carbon shearing means, if desired, although I find that in practice, the normally expansible ringlike members are quite sufficient to hold the square cornered edge 18 of the cross bar outwardly at a sufficient angle to clear the carbon or other deposit from the adjacent bearing surfaces.

In Fig. 4 I have shown such a device with the ringlike members 20 and 21 united by two crossbars 22 and 23, thus having all the advantages of a double carbon shearing and compression packing device, preferably with the crossbar 22 at the end of the rings where same are split, similar to that shown in Fig. 3, and with the cross-bar 23 diametrically opposite the split portion as shown in Fig. 1.

A further desirable feature of this construction consists in the facility for distribution of lubricating oil, a supply of the same being readily retained in the recesses 11, 12 and 13 and carried and distributed around the adjacent bearing parts through the gradual using up of oil, said recesses constituting a considerable reservoir and the packing device in effect acting as a retaining means or cover therefor.

It will be readily appreciated that I have devised a construction suitable for use between the bearings in many different points in an engine, where carbon or other deposit is apt to be formed, which construction automatically prevents the accumulation of carbon or foreign deposits on the bearing surfaces, the special design of carbon shearing member carried by and positioned through the normal expansible action of the ringlike members forcing the same to scrape and remove carbon from the bearing surface with which it contacts, while also constituting a tight packing therefor and a distribution means and lubrication reservoir.

My invention is further described and defined in the form of claims as follows:

1. Means for preventing the formation of carbon between the bearing parts of internal combustion engines, comprising a connecting means, a carbon shearing edge thereon, an inherently expansible split ring mounted at each end of said connecting means, a connection between said rings and said connecting means being adjacent the split in the rings, the split being in substantial alinement with the carbon shearing edge, whereby said carbon shearing edge is yieldingly held outwardly in operative position.

2. A carbon shearing device for internal combustion engines, comprising an expansible split ring, a bar attached thereto at right angles therewith, one side of said bar being in alinement with the split in said ring and a carbon shearing edge in the side of the bar in alinement with the split and in alinement with the periphery of said ring, whereby the shearing edge is forced outwardly tangentially of the split ring to hold said edge in operative position.

3. The combination, with an internal combustion engine, of means to prevent the accumulation of carbon or the like on the bearing surfaces, consisting in a plurality of inherently expansible split rings, a plurality of cross bars uniting said expansible rings, and a carbon shearing edge on one of said cross bars in alinement with the split in said rings.

In testimony whereof I have signed my name to this specification.

HENRY H. GOVE.